US006543795B1

(12) United States Patent
Merced Ferrer

(10) Patent No.: US 6,543,795 B1
(45) Date of Patent: Apr. 8, 2003

(54) WHEELED BASKET ASSEMBLY

(76) Inventor: Manuel E. Merced Ferrer, Carretera 812, Km. 2.8 BO., Dajaos Bayamon, PR (US) 00956

( * ) Notice: Subject to any disclaimer, the term of this patent is extended or adjusted under 35 U.S.C. 154(b) by 0 days.

(21) Appl. No.: 09/575,792

(22) Filed: May 22, 2000

(51) Int. Cl.[7] ............................................... B62D 39/00
(52) U.S. Cl. .................................................. 280/33.998
(58) Field of Search ...................... 280/33.998, 47.34, 280/79.11, 79.2; 206/503, 509, 511

(56) References Cited

U.S. PATENT DOCUMENTS 647,388 A * 4/1900 Evans
3,053,397 A * 9/1962 Bliss
3,160,292 A * 12/1964 Albrecht

* cited by examiner

*Primary Examiner*—Kevin Hurley
(74) *Attorney, Agent, or Firm*—J. Sanchelima

(57) ABSTRACT

A basket with a bottom and peripheral walls defining a cargo space therein. At least three legs are mounted to the underside of the bottom and each leg has a wheel assembly at the distal end. The legs are hollow and the internal diameter increases from the distal end so that the other end, mounted to the underside, cooperatively coincides with openings on the bottom. The legs are removably insertable through the openings and housed within each other so that the baskets can be stacked up in a volumetrically efficient fashion. Removable covers are mounted on the openings, when the basket is in use, to prevent objects from falling inside.

3 Claims, 1 Drawing Sheet

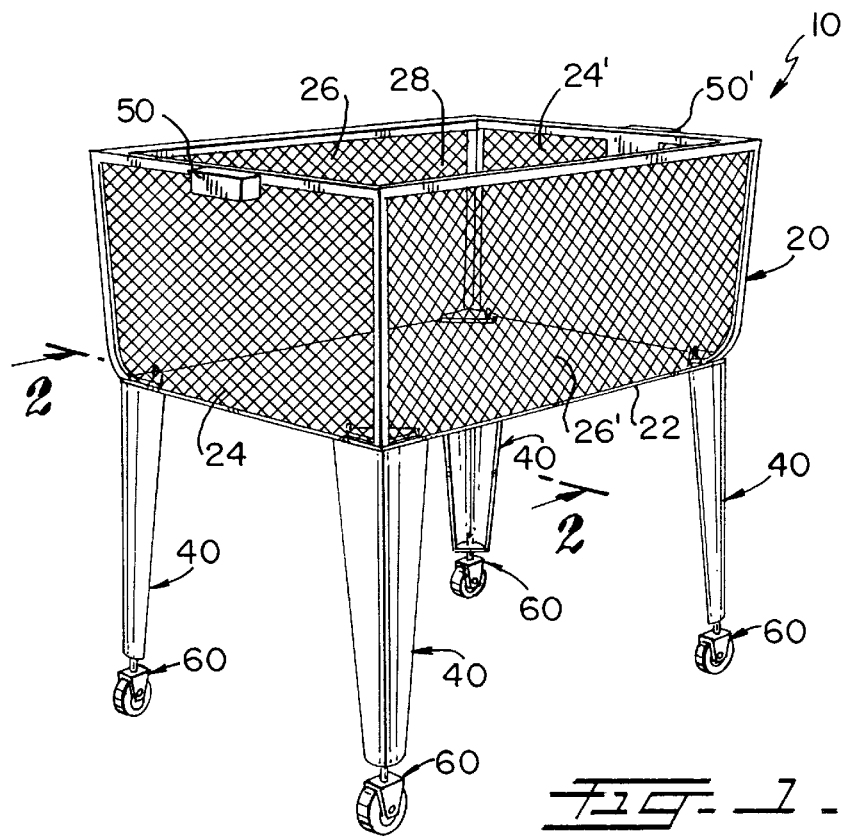
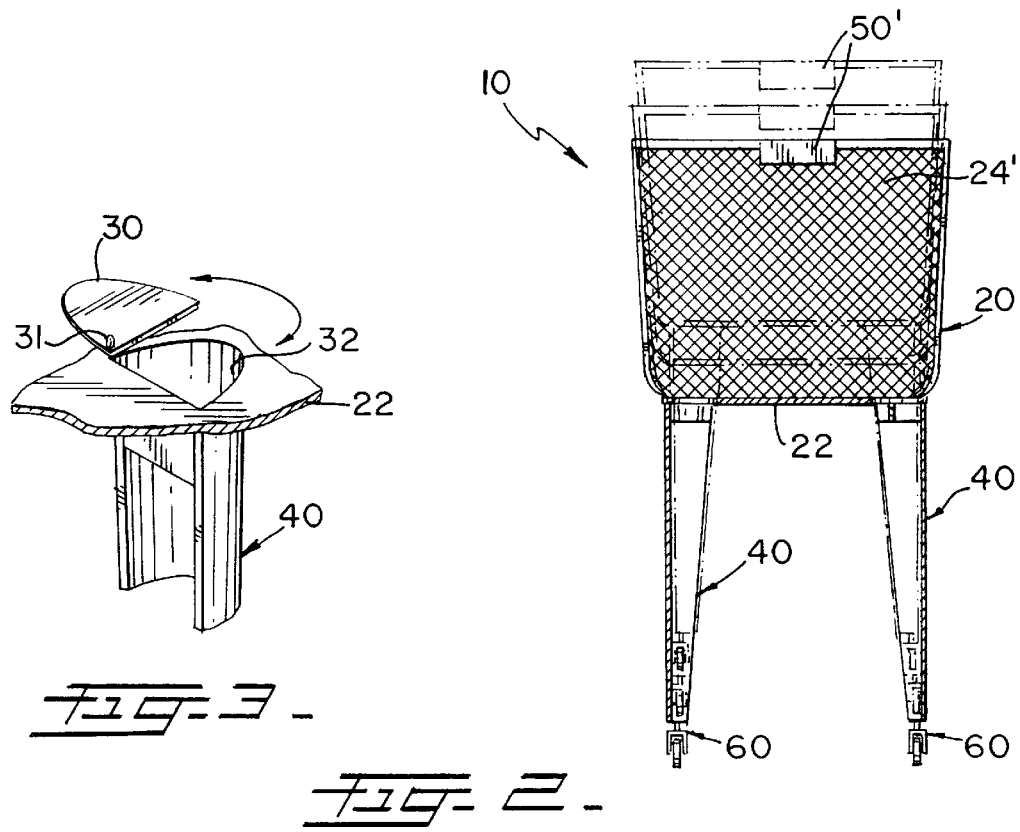

WHEELED BASKET ASSEMBLY

BACKGROUND OF THE INVENTION

1. Field of the Invention

The present invention relates to a wheeled basket with hollow legs, and more particularly, to such baskets that are stackable.

2. Description of the Related Art

Many wheeled baskets have been designed in the past, such as those used in laundries. These designs result in space consuming objects that clutter the typical household or business. The convenience of incorporating wheeled legs comes at a cost, the wheeled legs occupy more space. None of these designs, however, include hollow legs to make baskets stackable, thus minimizing the space necessary for storage. To accomplish this and preventing that objects fall inside the hollow legs, a cover member is used.

SUMMARY OF THE INVENTION

It is one of the main objects of the present invention to provide a stackable wheeled basket that is volumetrically efficient and that can be stored utilizing minimum space.

It is another object of this invention to provide a simple wheeled basket that can be readily handled and transported.

It is still another object of the present invention to provide a light wheeled basket of sturdy construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of a wheeled basket.

FIG. 2 shows a cross sectional view taken along line 2—2 in FIG. 1, showing in phantom other stacked baskets.

FIG. 3 illustrates an exploded view of a hollow leg with its aperture and its cover.

DETAILED DESCRIPTION OF THE PREFERRED EMBODIMENT

Referring now to the drawings, in particular FIG. 1, where the present invention is generally referred to with numeral 10, it can be observed that it basically includes basket assembly 20 and preferably four identical leg assemblies 40 extending perpendicularly from bottom 22. Basket assembly 20 including wall 24 opposite to wall 24' and wall 26 opposite wall 26', to define cargo space 28. Walls 24 and 24' are perpendicularly mounted to bottom 22. Handles 50 and 50' respectively are mounted to walls 24 and 24'. Walls 26 and 26' are also perpendicularly mounted to bottom 22. The distal ends of leg assemblies 40 include wheel assemblies 60. Leg assemblies 40 are hollow and the internal diameter decreases towards the distal end so that most of leg assemblies 40 of another wheeled basket 10 can be removably inserted within assembly 40 of another basket. Protruding handles 50 and 50' serve as a stop to prevent wheel assemblies 60 from becoming wedged inside the distal ends of leg assemblies 40. In this manner, wheeled baskets 10 can be readily stacked, one on top of another.

As best seen in FIG. 3, when not stacked and utilized for its intended function, cover members 30 may be placed over apertures 32 defined on bottom 22. Cover members 30 serve to prevent foreign materials from falling inside the hollow portion of leg assemblies 40. Cover member 30 is pivotally and slidably mounted on pin 31 to bottom 22, in the preferred embodiment.

Wheel assemblies 60 have cooperative dimensions that permit them to be received within leg assemblies 40. Baskets 10 can be readily stacked up in a volumetrically efficient fashion. Basket 10 needs to have at least three wheeled leg assemblies 40. Four leg assemblies 40 has been found to be preferred. In the preferred embodiment, the present invention may be constructed of a durable but light plastic material, since its applications typically involve laundry and other household tasks.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A stackable basket, comprising:
   A) a basket assembly having a bottom, and first, second, third, and fourth lateral walls mounted perpendicularly on said bottom and defining a cargo space, said first lateral wall being opposite to said second lateral wall, said third and fourth lateral walls are also opposite to each other and perpendicularly mounted to each other, said bottom being opposite to said cargo space and said bottom further includes at least three openings; and
   B) at least three hollow leg assemblies mounted to said underside, said leg assemblies having first and second ends, each of said first ends including a wheel assembly, said leg assemblies having an internal diameter that increases from said first end to said second end, and said second end being mounted to said bottom in cooperative alignment with said openings so that the first ends of other similar baskets are removably insertable through said openings thereby allowing said baskets to stack up, each resting on its respective said protruding handles.
2. The basket set forth in claim 1 further including:
   C) a cover member for each of said openings.
3. The basket set forth in claim 2 further including:
   D) first and second handle members mounted to said first and second lateral walls.

* * * * *